(12) United States Patent
Szeklinski et al.

(10) Patent No.: US 11,738,269 B2
(45) Date of Patent: Aug. 29, 2023

(54) INTERACTIVE SPORTS FAN EXPERIENCE

(71) Applicants: Deel Charles Szeklinski, Franklin, TX (US); Patricia Leigh Racher-Marr, Round Rock, TX (US); David Charles Fowler, Irving, TX (US); Charles Neville Parkhill, Austin, TX (US)

(72) Inventors: Deel Charles Szeklinski, Franklin, TX (US); Patricia Leigh Racher-Marr, Round Rock, TX (US); David Charles Fowler, Irving, TX (US); Charles Neville Parkhill, Austin, TX (US)

( * ) Notice: Subject to any disclaimer, the term of this patent is extended or adjusted under 35 U.S.C. 154(b) by 0 days.

(21) Appl. No.: 16/759,471

(22) PCT Filed: Oct. 27, 2017

(86) PCT No.: PCT/US2017/058764
§ 371 (c)(1),
(2) Date: Apr. 27, 2020

(87) PCT Pub. No.: WO2019/083544
PCT Pub. Date: May 2, 2019

(65) Prior Publication Data
US 2020/0282314 A1 Sep. 10, 2020

(51) Int. Cl.
| *A63B 71/06* | (2006.01) |
| *A63F 13/65* | (2014.01) |
| *A63F 13/46* | (2014.01) |
| *A63F 13/798* | (2014.01) |
| *A63F 13/812* | (2014.01) |

(Continued)

(52) U.S. Cl.
CPC .............. *A63F 13/65* (2014.09); *A63F 13/46* (2014.09); *A63F 13/798* (2014.09); *A63F 13/812* (2014.09); *H04N 21/2187* (2013.01); *H04N 21/242* (2013.01); *H04N 21/25891* (2013.01); *H04N 21/4781* (2013.01);
(Continued)

(58) Field of Classification Search
CPC . A63B 71/06; A63B 71/0616; A63B 71/0622; A63B 2225/20; A63B 2225/50; A63F 13/65; A63F 13/798; A63F 13/828; G06Q 10/06; H04N 21/4758
See application file for complete search history.

(56) References Cited

U.S. PATENT DOCUMENTS

| 7,743,070 B1 * | 6/2010 | Blumberg | .............. G06Q 10/10 707/783 |
| 2008/0311996 A1 * | 12/2008 | Belton | ............... H04N 21/4758 463/42 |

(Continued)

*Primary Examiner* — Lawrence S Galka
(74) *Attorney, Agent, or Firm* — Frisco Patent Services, PLLC; Henry Aldon Thomas

(57) ABSTRACT

An interactive gaming application which integrates real time data streaming from live sporting events in combination with user decisions which are based on the users intimate knowledge of sports, player positions and personal perspective regarding how fans believe professional sports players and coaches should perform and respond to real life circumstances which are observable and anticipated situations as they develop during the course of a game with integrated scoring, control and decision tracking methodologies to allow the game to synchronize with a live broadcast and the inputs provided by a multitude of players actively playing the game simultaneously.

9 Claims, 13 Drawing Sheets

(51) Int. Cl.
*H04N 21/2187* (2011.01)
*H04N 21/242* (2011.01)
*H04N 21/258* (2011.01)
*H04N 21/478* (2011.01)

(52) U.S. Cl.
CPC ..... *A63F 2300/558* (2013.01); *A63F 2300/61* (2013.01); *A63F 2300/69* (2013.01); *A63F 2300/8011* (2013.01)

(56) References Cited

U.S. PATENT DOCUMENTS

| | | | |
|---|---|---|---|
| 2009/0137298 A1* | 5/2009 | Bedingfield, Sr. ..... | G06Q 10/10 463/9 |
| 2016/0193521 A1* | 7/2016 | Colony ................. | G06Q 50/34 273/317 |
| 2016/0253919 A1* | 9/2016 | Coiner .................. | A63F 13/46 463/31 |
| 2017/0087472 A1* | 3/2017 | Moh ..................... | A63F 13/828 |

* cited by examiner

INTERACTIVE SPORTS FAN EXPERIENCE

FIELD OF INVENTION

Interactive entertainment system which facilitates User interactions in a game format while watching live broadcasts of sporting events. The system synchronizes User inputs to live sports events wherein the player is constrained to act and play the game in real time with the events occurring during the live broadcast. Decisions, choices and User performance factors are captured and used to score a multitude of User choices to create competition and feed back to the User. The system also benefits players of various ages and skill levels to better learn and apply decision making choices to real life events to help the player master strategy, situational awareness and overall effectiveness of the rules of sports, creativity regarding how the game is played and competition under pressure.

BACKGROUND OF INVENTION

"YOU BE" is an interactive entertainment system that allows the User to interactively engage a live event, and simulate the experience of a participant in that live event. For instance, the User can choose a sporting event and simulate the experience of an Athlete or Coach while watching or listening to the live sporting event. Users can call a play, or a pitch for example, and gain or lose points based on the outcome of their call. The system exercise can be applied to any position of any sport or event where Users can make their call while watching or listening to the live event of the User's choice.

A User of the present embodiment can imagine himself standing in the shoes of an actual athlete playing a position on the field which the User is watching in real time as the live sporting event proceeds. The system User can pick the plan of action that he feels the Athlete should also pick given the situation at hand. The system will measure the results of the User's chosen plan of action against the results of the action of the Athlete; which, will allow Users to be interactively engaged and "play" along with the actions of the live event. Users will be able to call plays based on their own knowledge of their perspective sport to attempt to outscore the Athlete and other Users. The User must quickly decide and lock in their call as to how a play should be made before the play occurs; and then, based in part on live event broadcast, the User's decision will be scored with points awarded accordingly.

Existing teaching in the field ranges from fantasy leagues to outcome based pari-mutuel betting. Fans for many years have demonstrated a captivating interest watching sports, tracking statistics and listening to talk radio and television to debate what an Athlete, Coach, or Team should do, could have done, or what might have happened if the play had been different. The present embodiment provides the User an opportunity to "stand in the shoes" of the Athlete or Coach and to interact in real time with the situations at hand, as they develop with real time feedback. Make the right call and the User is acknowledged with points. Get the call wrong and the User has a point reduction. The present embodiment provides for a fan experience that engages the fan with the actual event as it is played.

Depending on which event or sport is interactively simulated by the system, one would be mindful of strategy given the specific sport played and taking into account the Athletes involved and live event circumstances.

Some participants in youth sports will become Athletes and will make their own decisions on the field. At some point, most participants of youth sports quit playing and simply become "fans." Many fans take the games seriously and will compile stats and understand the nuances of these athletic games and the players.

Fans also participate in "fantasy sports," which has some similarity to this system, however these fantasy sports compare whole-game stats of individual players usually drafted in a league, to simulate the owner/manager experience, instead of simulating the play-by-play or situation-by-situation experience of the actual Athlete on the field.

Commentators working as sportscaster of live sporting events serve to teach the audience of the game. They are usually retired coaches or Athletes, and while the live event is in progress, these commentators will give their expert opinion to the audience. Especially in the common two-man commentator team, the "color" commentator is on hand to mostly give expert opinion about what already happened and what he suggests next.

The present embodiment will bring a new form of entertainment and level of excitement to enjoying live sports. It will allow Users to "play" along with live events by choosing and locking in their call before the play occurs. The User will be able to use their own knowledge of the sport to outscore the Athlete. The User selects what should be done under specific live event circumstances and locks in that selection or call and compares it to the actual play that occurred.

The present embodiment is unlike a pure sports betting system, since in a pure sports betting system the predicted selection from person 1 has to match selection and occurrence from person 2. There are many gambling type sports bet systems with handicapping and odds available for use. This is an interactive entertainment system based on live events. The system encompasses the User's choices with the choices of the Athlete on the field while the event develops, live, and scores User choices accordingly based on its unique scoring system. The User's scored results may be compared to the scored results of other Users for wagering opportunities.

The present embodiment is unlike fantasy sports, since the basis of the scoring begins with a quick selection by the User and that selection is locked in and scored based on the real time live situational performance of the Athlete. There are many fantasy type game systems where players can draft players to compose a team and join a league. This is not a fantasy sports system as the sports world knows it, since this system can be played by one player or unlimited players, for a single play, each imagining to be in the Athletes shoes.

The present embodiment comprises a unique scoring system for the potential outcomes of plays, rules as they apply to the game and strategy commonly associated with each sport. This unique scoring system also captures the appeal of live sports through a unique correlation of points awarded to the User based on the "thrill" or "impact" to the game outcome when a game changing or defining moment occurs and which the User anticipated. The present embodiment allows the User to assess the situation, contemplate the outcome and apply a personal choice to how the Athlete should act in the given circumstance. Points are awarded to the User according to the routines and factors incorporated into the system and the results of the play which just occurred. In baseball, pitches are thrown to the batter who must be prepared to adapt to the situation at hand wherein the pitcher can throw a number of pitch types, thrown at various speeds with various accuracy. The opportunity presented by the present embodiment is to allow the User to select the type of pitch to be thrown, whether or not the batter will swing at the pitch and what the result will be. For the User, all of these decisions must be entered in real time. As the play develops, the User will be scored and will be rewarded with points if the User has chosen a pitch that resulted in a favorable outcome by the Athlete.

Although there are several apparatuses which may have various functions related to Interactive Sports Fan Experience, none separately or in combination, teach or anticipate the current invention. Therefore, there remains an unmet need in the field of interactive sports fan experience games. The current invention will fulfill this unmet need.

SUMMARY OF INVENTION

The following presents a simplified summary to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present embodiment is illustrated as an interactive game which is played, by Users, in real time with a live broadcast of a sporting event. A multitude of Users can play the game in real time. Scoring is performed in real time and each User can know their current scores and use those scores to compare their results to other Users in real time.

The present embodiment is synchronized with the live broadcast. As a sporting event is televised, data is provided for use within the present embodiment to control the span of time in which a User is allowed to assess the current situation, make a decision as to what an Athlete or Coach should do next, and lock in that choice before the actual play begins on the field.

The present embodiment further comprises databases, processors and memory devices which are allocated to a User to capture and record the User's choices as compared to the Athlete's actions during the live event. By applying internal rules and capture techniques, the playable window opens and the User makes choices. The playable window closes based on time stamps contained within the data feeds associated with the live event. Analysis, storage and scoring are functions within the present embodiment which are utilized to track the performance of the User and the Athlete to produce a result for the User.
Such results are tracked to allow Users to compete with other Users.

The present embodiment develops an environment in which a User who wants to interact with a live broadcast of a sporting event can experience being on the field as the game is played. Here, an individual watching a live broadcast becomes interactively involved in this real-life situation, as he initiates his own decision-making process; decides on his plan, and executes his own actions which show results. The actual results that occur in the real-life situation can then be measured and recorded.

In the present embodiment, a Player who is interested in baseball might watch a game and would like to "play" the role of pitcher. For example: "You be the pitcher". A User is watching the game. The User, who knows the game theory, strategizes in his mind that if he were on the mound, he would throw a fastball down the middle in this current circumstance. However, the actual pitcher on the field (Athlete) throws a breaking ball low and the batter hits a homerun. As the Athlete on the field is scored in a negative way for pitching a homerun, the User would have recorded a better decision and scored accordingly. Alternatively, if the pitcher strikes the batter out and the User selected the same pitch, the User is awarded points.

In the present embodiment, a Player who is interested in football might watch a game and would like to "play" the role of quarterback. For example: "UB The QB", noting that UB is the trademark of the applicant hereto, generically meaning "you be". A User is watching the game. The User, who knows the game theory, strategizes in his mind that if he were about to take the snap as the QB, he would hand off the ball for a run up the middle in this current circumstance. However, the actual QB on the field (Athlete) throws a deep pass over the middle for a touchdown. The QB on the field is scored in a positive way, however, in this outcome, the User would not be awarded points. Alternatively, if the actual play was a hand-off run up the middle for a loss, after User and the Athlete on the field had previously picked the same play, they would both lose points.

The present embodiment provides an experience which begins or stems from the experience of a fan watching a live game, wishing to give commentary. As fans watch live sporting events on TV they realize that there are many situations where a play on the field was called or executed in a way and can sometimes result in a different outcome than an outcome that the fan expected.

After the play is realized and recorded, the fan in disbelief will exclaim something to the effect of "what were they thinking?" or "why didn't they pass the ball?" etc. . . . "If I were there I would have passed to Smith on the right side!" This is what often happens. The moment where the fan believes their choice was better. The present embodiment provides a new form of entertainment and allow one to record their choices and compare them against the outcome of the actual plays that occur.

In the present embodiment, the system continuously receives updating real-time data from the live event and compares the input from the system User and the results from the real life activity. The present embodiment incorporates collecting, filtering and storing the preferred data acquired from the live event.

There are many different sources of sports data gathered in the market for commercial use. The present embodiment takes such sports data from a commercial service which is interfaced by a program loaded based on computer or cloud based server and compared to the User choices to events in the sporting event.

The present embodiment provides the User opportunity to apply and improve their knowledge of the sport, the rules of the sport and the decision making process involved in participating in the sporting event. By creating the playable window, the User must observe, assess, decide and act in real time, just like the Athlete on the field. Using the scoring functions for the present embodiment, the User can begin to quantify the effectiveness of decisions which the User is making as if the User is actually participating in the sporting event. This interactive experience can help the User understand strategy, master better techniques for calling plays, and can make watching live events more exciting by giving the User the sense of being the Athlete or Coach.

The present embodiment also allows for Users to assume the role of a Coach. In simulating the role of Coach, the User can develop better awareness of the strategy of the game and managing Athletes. What should the next call be? Who should substitute and where? When to pull a pitcher? Field goal or go for touch down on 4th and long? These are questions that are subject to endless hours of debate after the game is over. The present embodiment provides real time interaction between the anticipation of watching the live broadcast and the importance of making a decision at the moment and being rewarded for favorable results on the sporting field of play.

Real Coaches can use the present embodiment to teach and reinforce sports ethics, rules of the perspective sport, situational awareness, and strategy to Athletes on their teams. The experience which the present embodiment provides, reinforces the real life teaching moments which young Athletes and seasoned Athletes must master to excel in their perspective sport. With endless numbers of games and events to watch, watching sports becomes more than just watching TV; it becomes a means to improve and excel in sports. Users of the system using the present embodiment benefit from exposure to a multitude of situations that develop during the course of a sporting event and can learn from the experience as they interact with the event.

The present embodiment also provides Users better understanding of the rules of their perspective sport. By participating in the sporting event interactively through the system, the User must master the rules and apply them to the situation in real time. The consequence of making a bad choice in the call is reflected in the User's score. The reinforcement of applying rules in real time develops a better overall understanding of the sport and how it is played.

The present embodiment is focused on the User making decisions during the playable window. As the live event proceeds, a continuous stream of events occur during which the User must observe, assess, decide and act all within the playable window. The User must be alert and aware of the situation at hand to call a favorable play and score points. The experience gained by operating the system in the present embodiment will enhance the time-limited, decision making, skills for Users operating the system.

The present embodiment provides a means for competition between fans of different sports. Since the core of the present embodiment is to stimulate competition based on making favorable decisions, it is possible for one User to interactively engage a baseball game while another User interactively engages football game. Points are earned by making calls that produce favorable results. If the User that is interactively engaged in a baseball event calls a favorable pitch, and the User with whom he is competing against is interactively engaged in a football event and calls a favorable play, then the outcomes are comparable and therefore support competition between the two Users. The compared outcomes between Users is a measure the effectiveness of each User against the other in terms of making calls during the playable window.

Scoring is also correlated to the significance of the play called at the particular point of time in which the play occurs. A game changing event can occur at any time during the live event and a User's score can be enhanced as a result of anticipating a "game changing" or "defining moment" event. This correlation of getting the call right and understanding the significance to the outcome of the game should the play develop as anticipated is recognized and rewarded to the User through enhancement to the score the User achieves for getting that call right.

Still other objects of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, regarding the following figures.

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
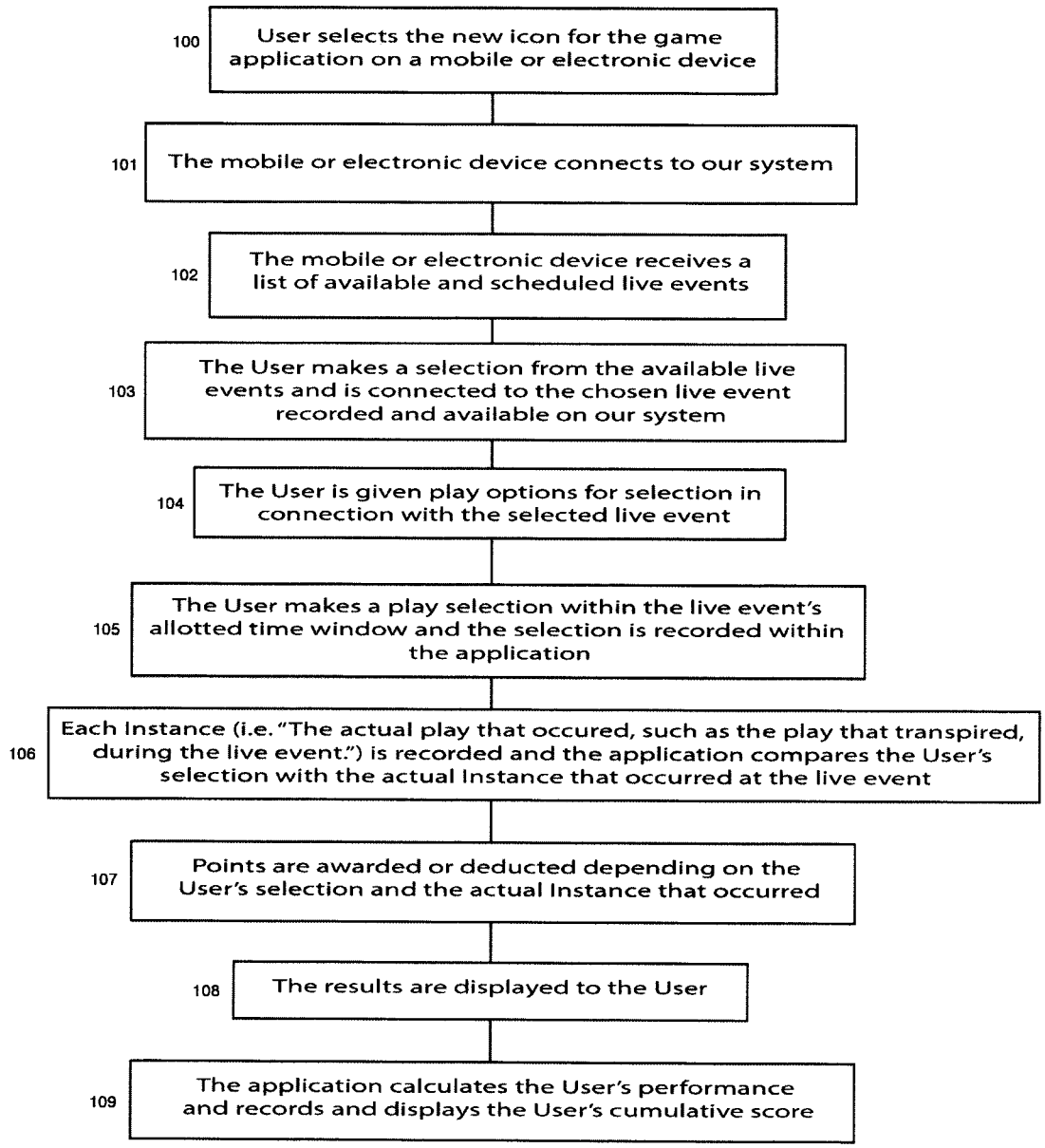
FIG. 1 is a flow diagram of the logic utilized to control and operate the solution presented in the present embodiments.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION

The claimed subject matter is now described with reference to the drawings. In the following description, for purposes of explanation, numerous specific details are set forth in order to provide a thorough understanding of the claimed subject matter. It may be evident; however, that the claimed subject matter may be practiced with or without any combination of these specific details, without departing from the spirit and scope of this invention and the claims.

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be routine undertaking for those of ordinary skill in the art having the benefit of this disclosure.

This invention relates to a unique cumulative recording system, while watching or listening to a live event, the application User is able and required to lock in the call, the decision, the choice, the strategy (i.e. "The Call") before the actual live instance occurs, and The Call Is made based on the application User's knowledge of the live event, experience, available screen information, assessment of the live event, assessment of the athlete, luck, assessment of the current circumstance, and The Call is limited to the available selection of options given to the application User. Once the live instance occurs, (i.e. "The Play") the application User's locked in selection (i.e. "The Call") is compared with the actual Play that occurred, and the application User will ether obtain or lose points based on the unique scoring system.

With the proliferation of data being collected and distributed over the Internet, more uses for collected data are materializing. This invention records and instantly makes available multiple live data feeds. The application utilizes that distributed data and acts as a game platform allowing Users to participate during live events enhancing their personal experience. Users are also able to make simple decisions, within a playable window, regarding the outcome of Instances during live events such as music competitions, legal proceedings, reality and real world competitions, and even play-by-play decisions for sporting events such as football, baseball, racing, golf, soccer, or any of a number of other sporting events. Users are scored and rated on their involvement.

FIG. 1 is a flow diagram that illustrates the logic utilized to control and operate the solution presented in the present embodiments in the form of a mobile application. Once the User selects the application on a mobile or electronic device, a direct connection is made between the User and the system. The system displays a list of available live events that the User can choose from. Once an event is selected, the User is then connected to the data that is available on the system and is given play options according to the type of event.

Given the available information from the actual live or broadcasted event, while following the rules and regulations set forth by the event, the user is directed to make and select a decision, which is then stored within the application. As the actual instance of the event occurs, the application then compares and scores the User's selection with the actual instance that occurred and a score is generated and displayed as a result of that comparison. The application collects the User's selections and calculates a value based on their performance, which is then compared to other User's participation.

Figure 2:
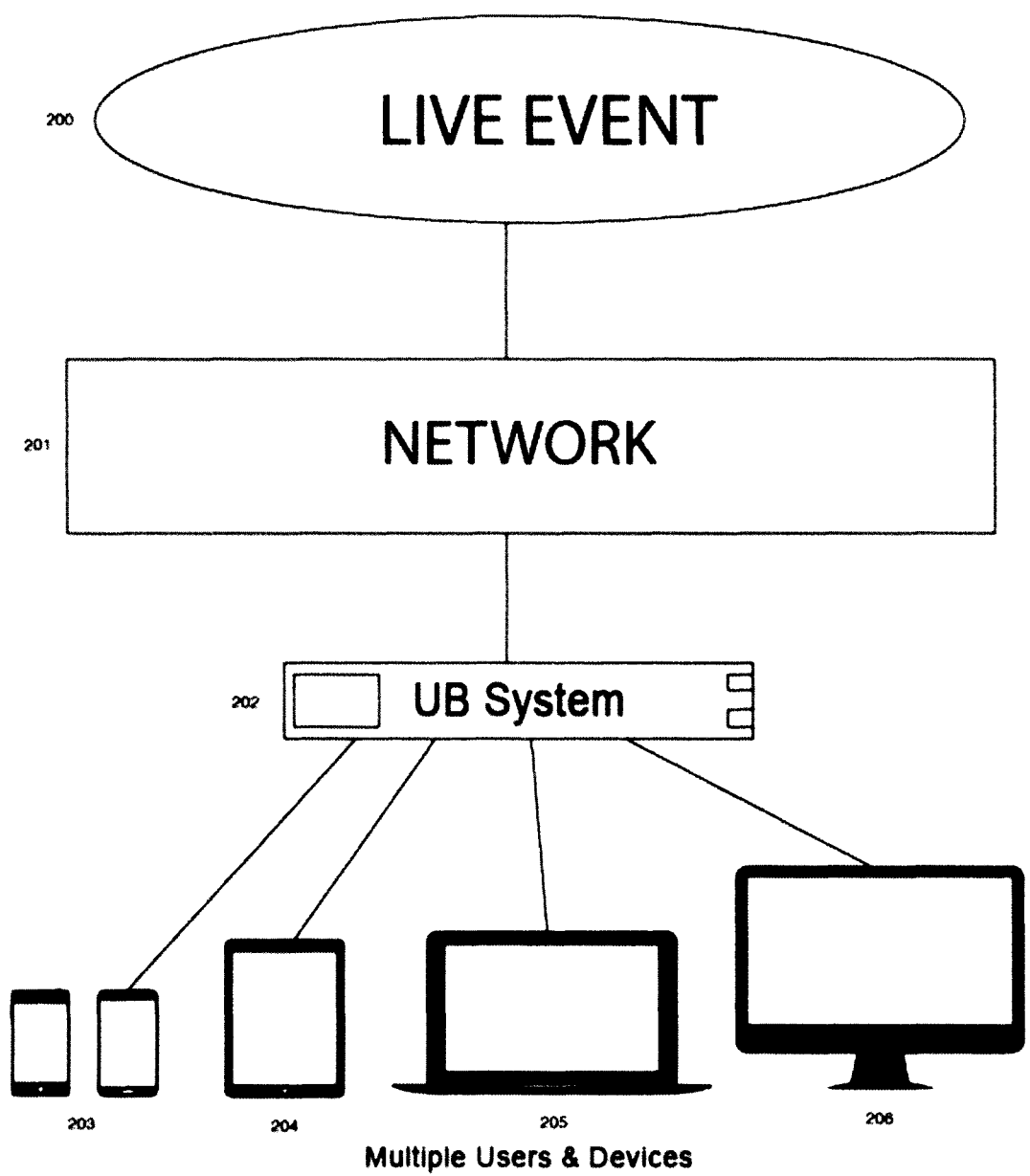
FIG. 2 is a block diagram illustrating a network system, according to example embodiments.

FIG. 2 is a block diagram illustrating a network system according to one embodiment. As instances (i.e. situations, actions, descriptions, and imagery) happen during a live event 200, each instance is recorded and transcribed into data and content. The data is immediately made available on the network 201 for distribution as it happens. The data may pertain to various instances and aspects associated with the live event.

A server configured to receive the data 202, organizes and stores it as it happens and immediately makes it available to the application within the system. The application can be on many different mobile or electronic devices such as a mobile phone 203, a mobile tablet 204, a laptop computer 205, a desktop computer 206, or many other electronic devices not yet materialized.

Although illustrated herein as server architecture 202, as an example, other embodiments may include other network architectures such as a cloud server or a distributed network environment.

As a User makes a selection from the application on their chosen device, a connection to the specific data being requested is made with the server 202. The requested data is received by the application and immediately made available for comparison, analysis, further distribution, or information. Simultaneously, User information and selections made within the application is recorded on the system server and made available for further needs such as historical data.

Figure 3:
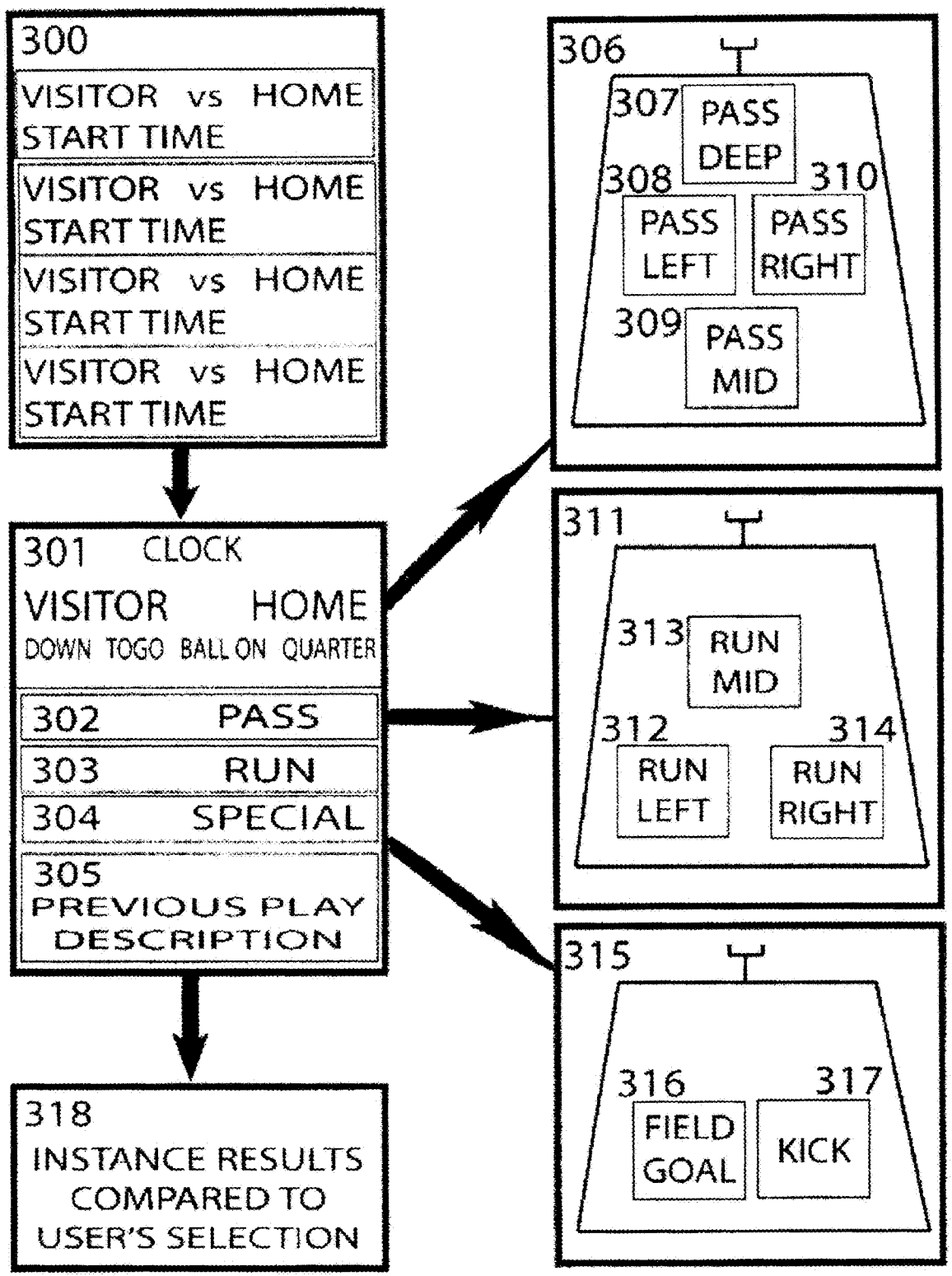
FIG. 3 illustrates the process flow and example screenshots on a Smartphone display of the User Interface of "UB The QB", noting that UB is the trademark of the applicant hereto, generically meaning "you be", after executing the app.

In FIG. 3, one embodiment is illustrated as an interactive application on a mobile or electronic device. This particular version is a football game, allowing the User to make play-by-play calls, within the playable window, as if they are the quarterback on the field. As soon as a User executes the application on their device, the application calls into the server and generates a list of live available football games scheduled that day or currently in play. Once the User makes a selection from the list 300, the application connects to our system server 202 and data from the chosen live event is instantly recorded and made available.

The application then opens the play screen where information from the actual live game is immediately populated and displayed within the scoreboard 301 improving the User's process of developing a strategy and executing their decisions. The User is then given the option to call a pass play 302, a run play 303, or make a call from the special plays 304 when necessary. The previous play description and result is also displayed 305 that improve the experience making it more engaging.

If the User decides that they want to call a pass play, they select pass 302 and the application opens to a pass screen displaying a field prospective 306 showing the line of scrimmage along with additional play options such as pass deep down the field 307, throw a short pass to the left 308, or a short pass up the middle 309, or they can go with a short pass to the right side 310.

If the User decides to call a run play, a similar play screen, the run screen, opens within the application with a field prospective 311 also showing the line of scrimmage and the User is given the option to call a run play to the left 312, a run play up the middle 313, or a run play to the right as illustrated in 314.

When the situation calls for it, the User can choose the special plays button 304 from the main play screen, and a different play screen opens with a field prospective 315 and options to kick a field goal 316 or punt down the field 317. After the User has made their call, within the playable window, by selecting from the available choices, the application locks in and stores their decision and defaults back to the main play screen. The system receives the play-by-play data as it occurs on the field and the application immediately compares the User's choice with the actual live Instance that took place. The live Instance results are compared with the User's selection and the User is scored accordingly. The application then opens a results screen and the actual Instance, the User's choice, and the score is displayed 318.

Figure 4:
FIG. 4 illustrates the process flow and example screenshots on a Smartphone display of the User Interface of "UB The Pitcher", noting that UB is the trademark of the applicant hereto, generically meaning "you be", after executing the app.
Figure 4A:
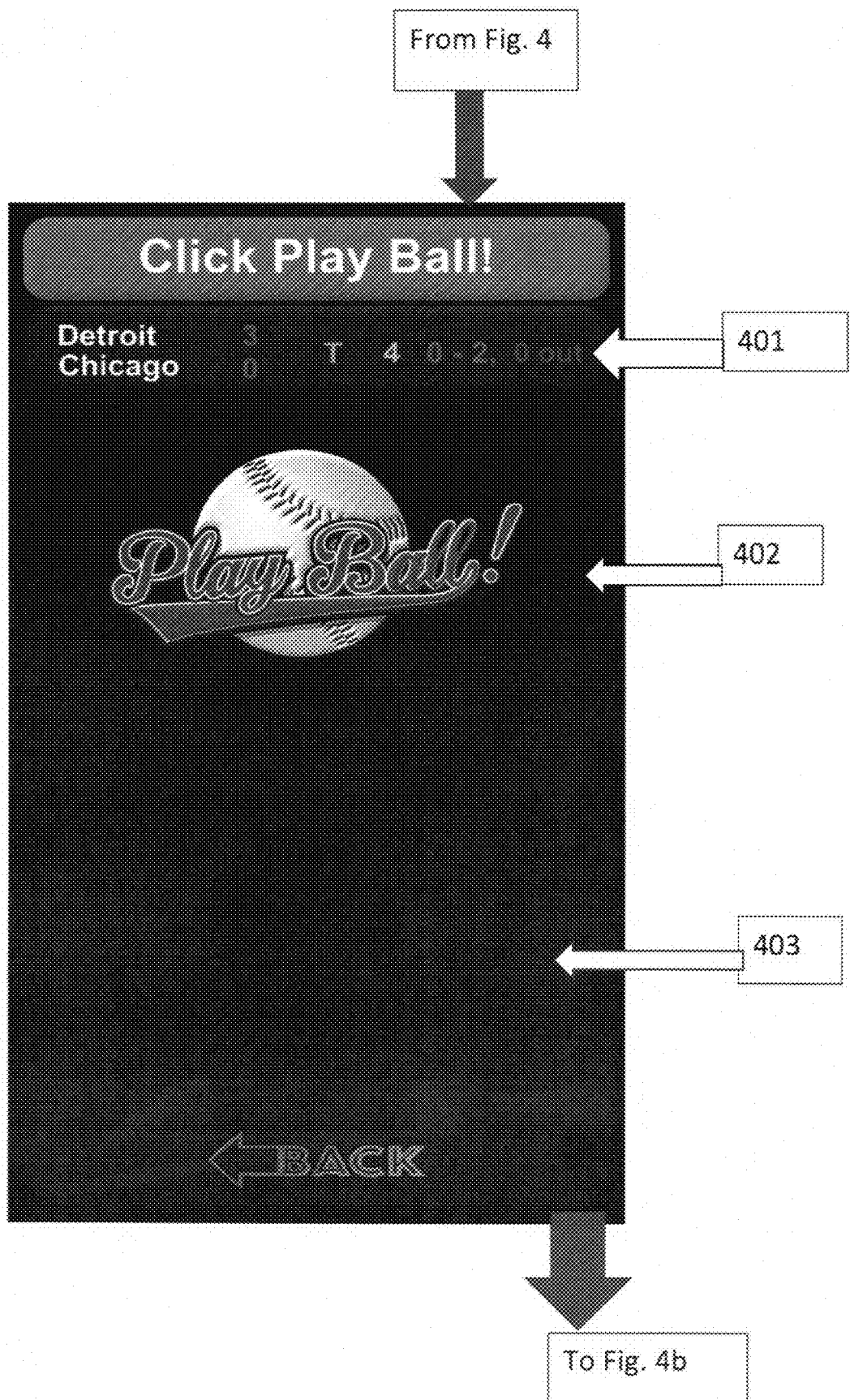
Figure 4B:
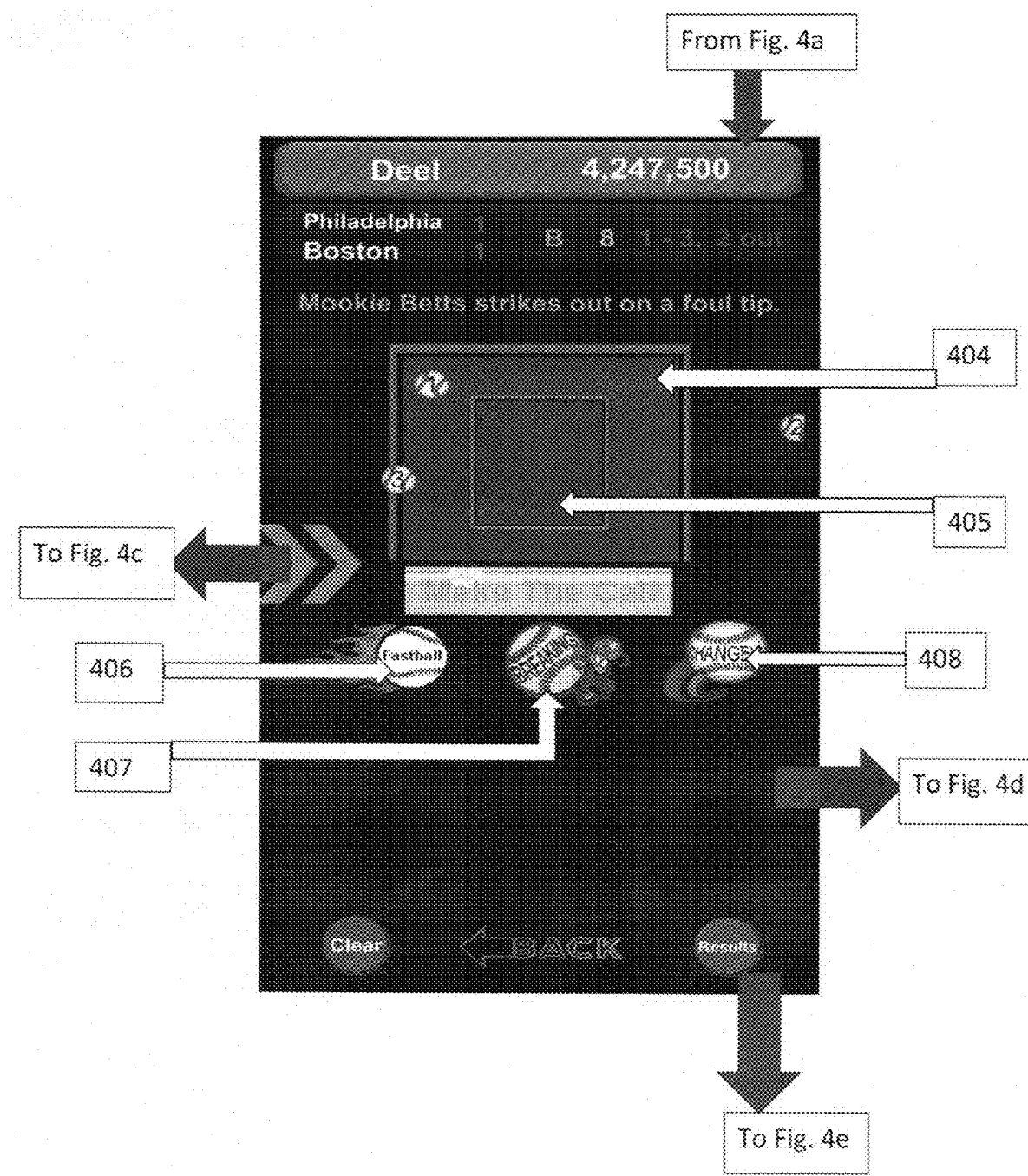
Figure 4C:
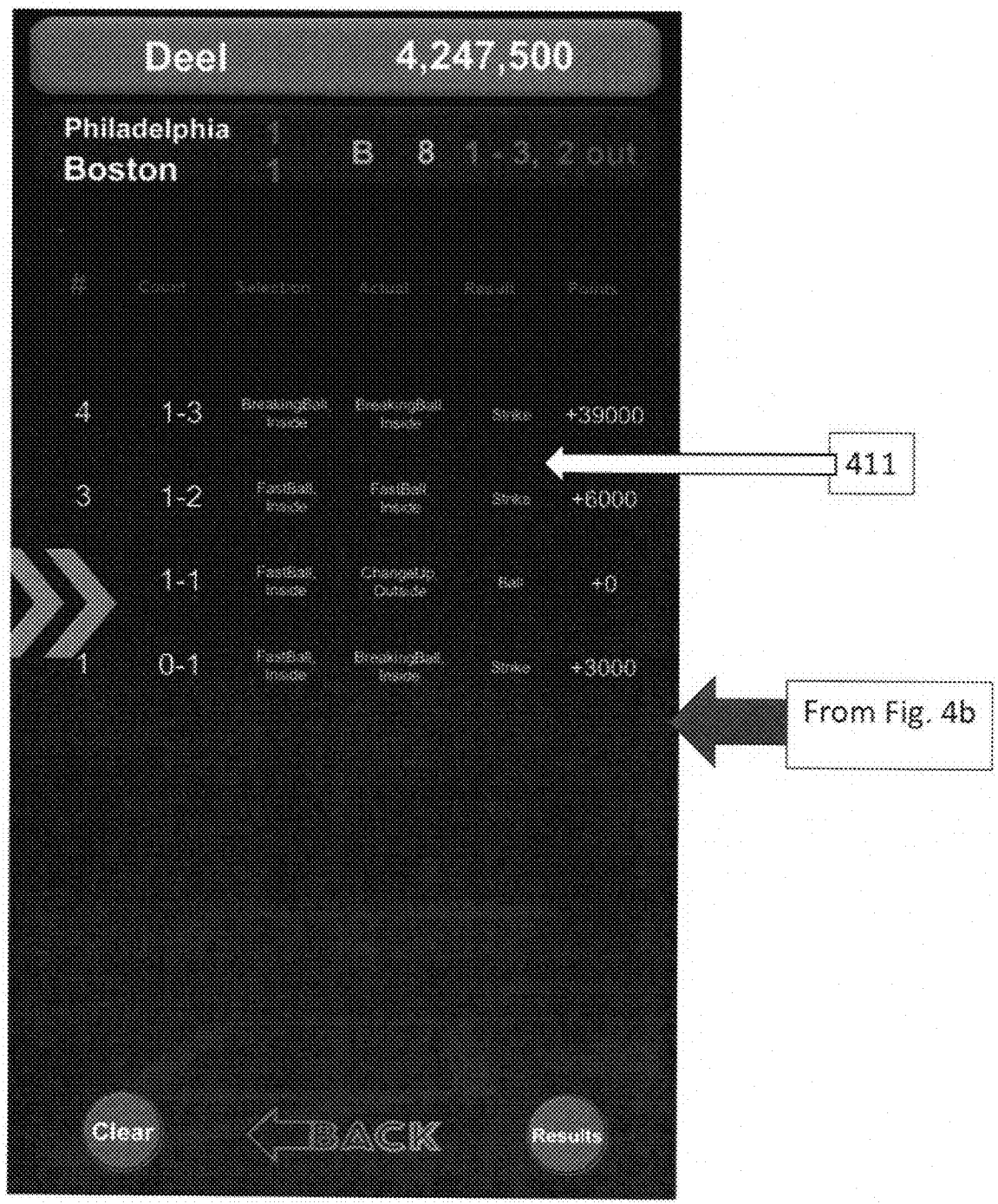
Figure 4D:
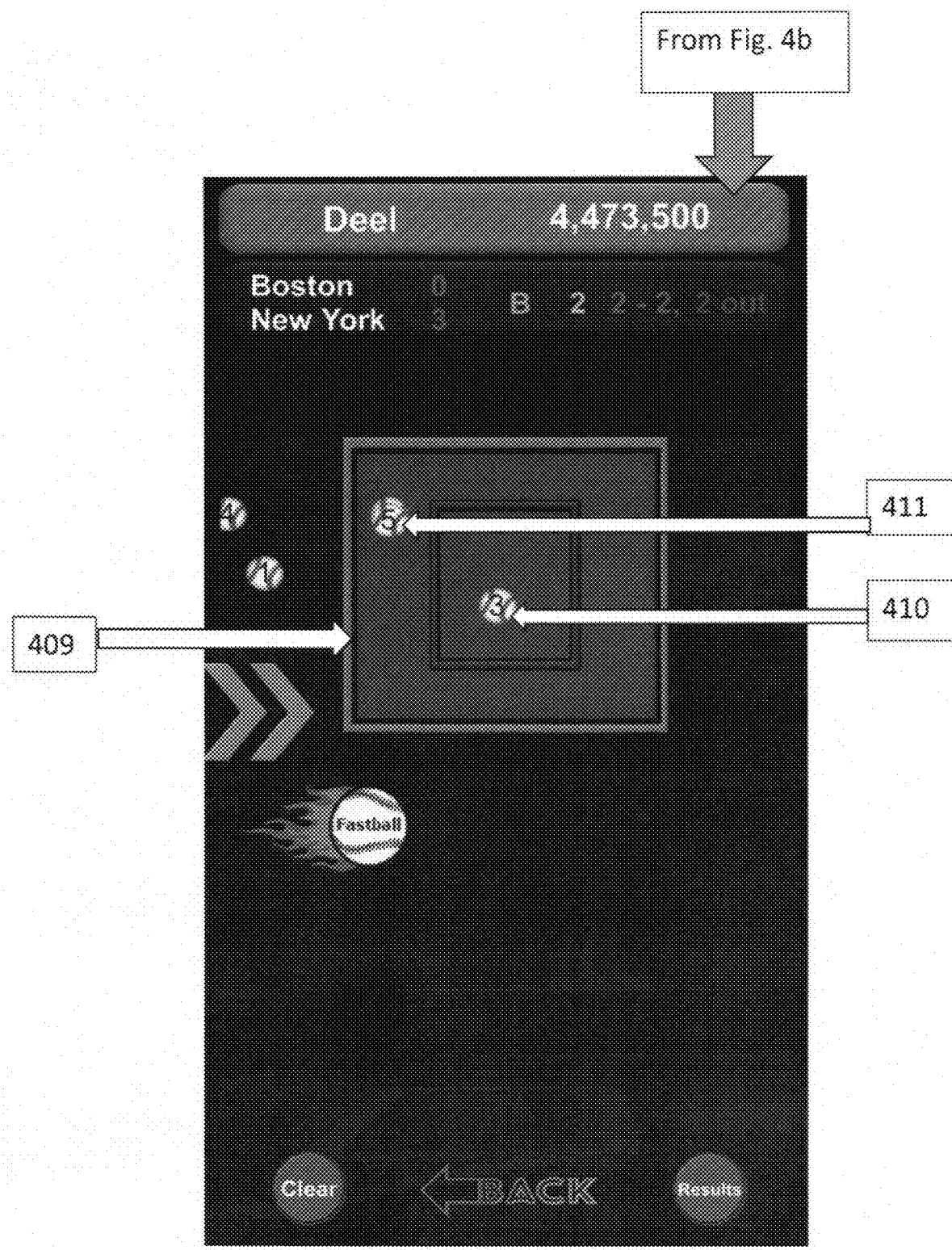
Figure 4E:
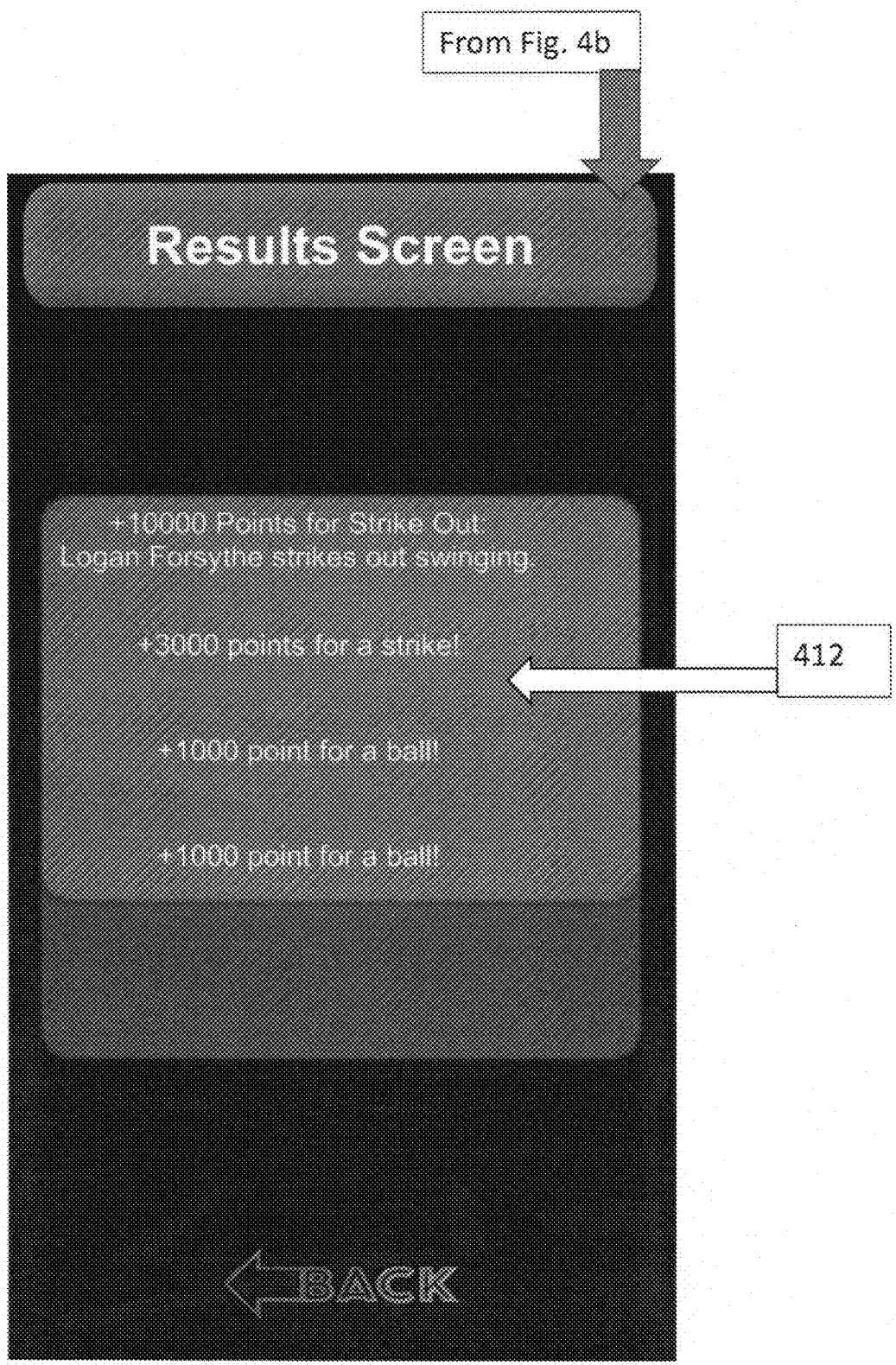

Continuing on with FIG. 4 another embodiment is illustrated utilizing live baseball data. Similar to the football game, a prospective is displayed as a list of live available baseball games 400 for the User to choose from. Once the User makes a selection, the application connects to the system and once again, data from the chosen live event is instantly recorded and made available through the application allowing the User to get in the mindset of being the actual pitcher on the mound.

A main screen opens up that has a scoreboard 401 which is instantly populated with the teams playing, their scores, the current inning, pitch count, and outs in near real time. A description of the last play results is also displayed 403. The User then chooses the Play Ball button 402 and the application opens to the play screen.

Within the play screen, the User is given the option to pick the next pitch that will be thrown, within the playable window, just as if they were pitching against the current at bat. In this case, the User is given the option to throw a fastball pitch 406, a breaking ball pitch 407, or a changeup pitch 408. They are also able to choose the location of the pitch that should be thrown next, weather it is inside the strike zone 404 or outside 405. The User's decision is recorded and locked in. Within the same play screen, the User is able to see the actual location of each pitch as it is thrown 409. The User can see as it happens if the last pitch was in the strike zone 410 or outside the strike zone 410. A button within the play screen opens a panel for the User to view more detailed results 411 that occur with each pitch thrown during the current at bat, as well as the recorded choices the User makes.

As the Instance on the field occurs, the actual pitch and pitch location coordinates are received by the system and displayed within the application.

Simultaneously, the application compares the results of the actual pitch that occurred and the User's selection. The application scores the User's decision and displays the result after each at bat 412.

Figure 5:
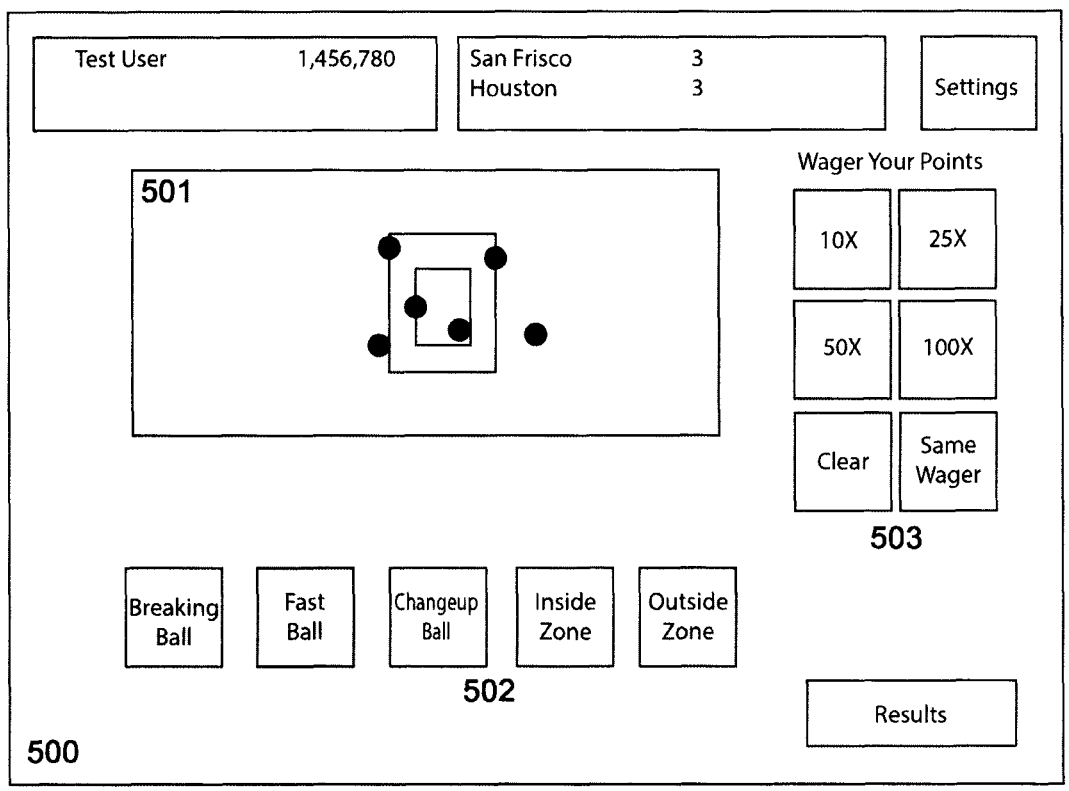
FIG. 5 illustrates an expanded embodiment of the interactive system, modified by offering the user a chance to increase or decrease the amount of points that are already established in the unique scoring system.

The User is able to select a modifier that corresponds with how strongly the User feels about their selection. FIG. 5 is a screen shot of an expanded embodiment used with a baseball game. 500 is the system User's interface. In this case, represented by a touch screen tablet computer 501 is the visual display on the User interface that shows the User details of the live baseball game. 502 shows the system selection buttons or choices given to the User by the system to interact with the baseball game. 503 shows modifier buttons that allow the system user to enhance his scoring in conjunction with the unique scoring system. In the illustrated embodiment, the User can modify the points scoring structure by 10, 25, 50, or 100 points. The modifier may be a set number of points, or even separate points, or a wagering pool then that of the primary score given and maintained by the system. Point enhancements are also available for User choices corresponding to correctly anticipating and choosing a "game changing" play at the appropriate time to greatly impact the outcome of the game.

Figure 6:
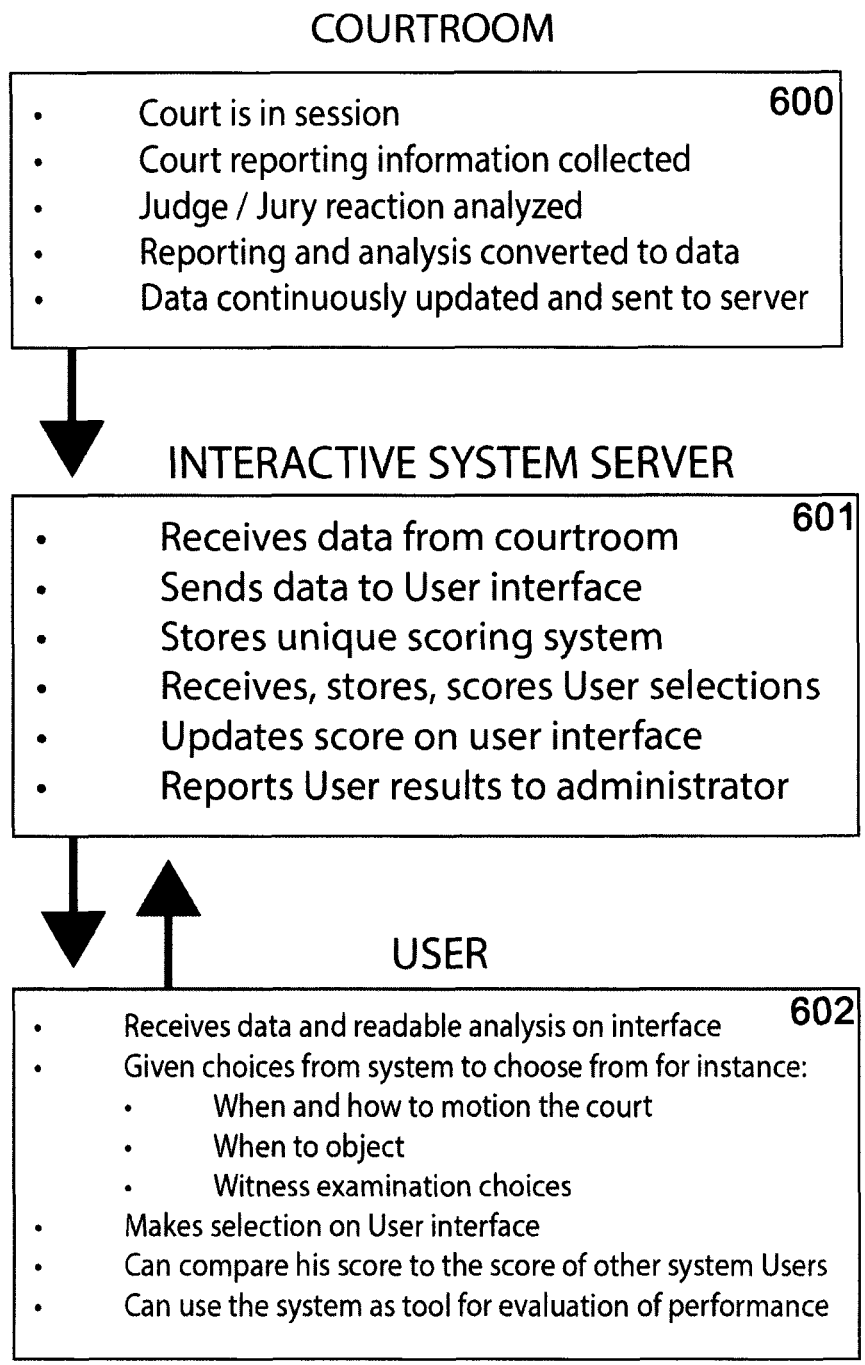
FIG. 6 is a box diagram of a system embodiment relating to a legal proceeding.

FIG. 6 is a box diagram of a system embodiment relating to a legal proceeding. In this exampled embodiment, beginning with the courtroom 600, while court is in session, court reporting information is being collected and Judge and Jury reactions are analyzed. The reporting and analysis is converted to data and continually updated and sent to the network server 601. The server records and sends the courtroom data to the User Interface. The server records and locks in User selections sent from the User Interface, and the selections are compared to the courtroom data using the unique scoring system. The server updates the User Interface and can send User scores to an administrator, or professor, or a principle for evaluation of User abilities. The User 602, receives reporting and analyses data on User Interface. The User Interface displays the available system choices, makes a selection at the appropriate time. The selection is locked in and available on the server. The User can ultimately use the system to measure his performance or ability with that of other Users and use the system as a tool to evaluate areas that need improvement in the environment of a court that is in session.

Figure 7:
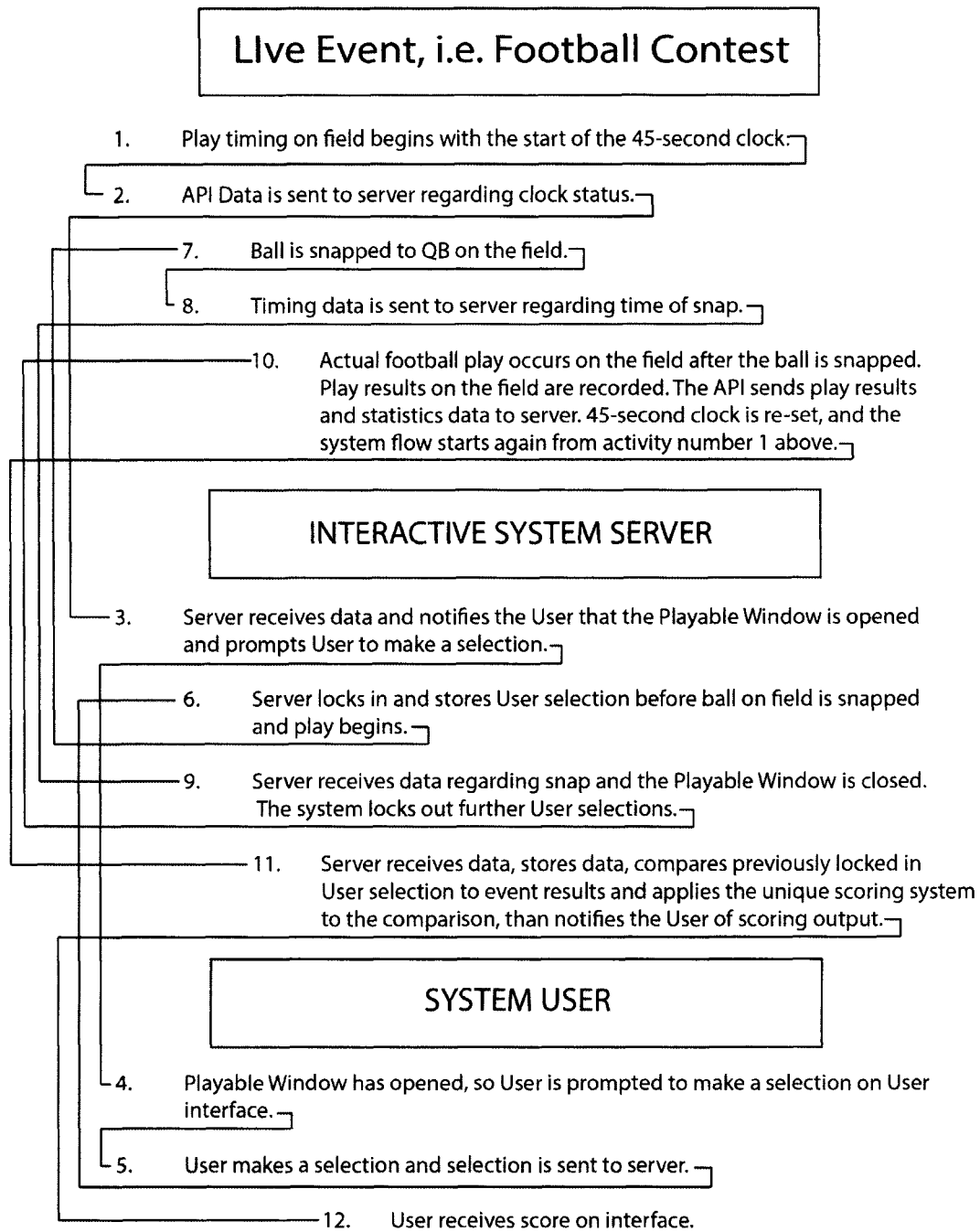
FIG. 7 is a process flow illustrating the logic utilized in order to allow Users to interact with a live football contest's Playable Window.

FIG. 7 is a process flow illustrating the logic utilized in order to allow Users to interact with a live event's Playable Window. In this case, the live event is a football contest. Play timing on field begins with the start of the 45-second clock. At that time, API data is sent to server regarding clock status. The server receives data and notifies the User that the Playable Window is opened and prompts the User to make a selection. While the Playable Window is opened, the User is prompted to make a selection on the User Interface. Once the User makes a selection, the selection is sent to the server. The server locks in and stores the User's selection before the ball on field is snapped and play begins. When the ball is snapped to the QB on the field, timing data is sent to the server regarding time of snap. The server receives data regarding the snap and the Playable Window is closed. The system locks out further User selections. The actual football play occurs on the field after the ball is snapped. Play results on the field are recorded and the API sends play results and statistics data to server. The 45-second clock is reset, and the system flow starts again from activity number 1 as illustrated in FIG. 7. The server receives data, stores data, compares previously locked in User selection to event results and applies the unique scoring system to the comparison. Than the server notifies the User of scoring output and the User receives score on interface.

Figure 8:
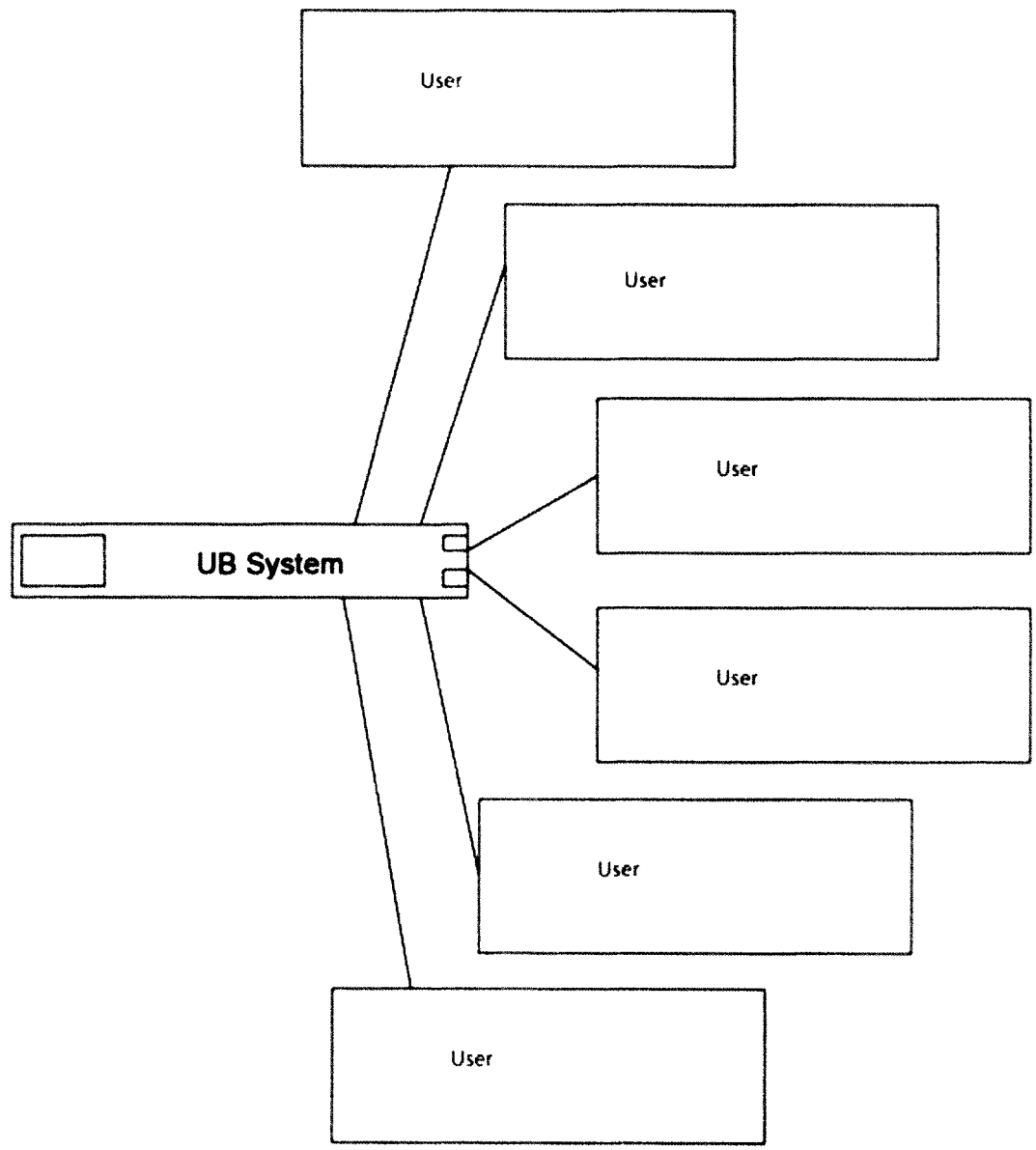
FIG. 8 is a system chart that illustrates the "UB" Users being connected through the server for competitions and communication through a messaging platform.

When playing the "UB" games, Users are able to compete for level placement by outperforming other User's and even message or trash talk each other about the current game. FIG. 8 is a system chart that illustrates this showing the "UB" Users being connected through the server.

Although the preferred embodiment has been described in detail, it should be understood that various changes, substitutions and alterations can be made therein without departing from the spirit and scope of the invention as defined by the appended claims.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

We claim:

1. A computerized method of determining a playable window of variable time unique to a player identified and interacting alone, or with a number of other players simultaneously, wherein each player interacts as a unique and separately differentiated system user in a synchronous manner of play with an associated live event comprising actual participants at designated positions in a known sport with known rules and acceptable plays within the known rules which comprise a game, where a player attempts to mimic an actual participant assigned to a designated position, comprising:
   a. A live broadcast event containing real time events, the subject matter, of an activity with defined positions, established rules and scoring, and actions or plays within the established rule
   b. At least one actual participant assigned to a position and position location in the event;
   c. A data feed with event timing, historical data, at least one real time event and changes in facts and circumstances related to the event incorporated;
   d. An opening moment with at least one start signal within the data feed;
   e. At least one API, including at least one API for the data feed;
   f. A system comprised of at least one server with CPU memory, and means to receive and process the data feed using the API;
   g. At least one database and as least one database as a system database;
   h. At least one system user as a player;
   i. At least one playable window and at least one playable window controller;
   j. At least one player's choice and at least one player's choice which further comprises a game changing decision;
   k. A player's choice input controller;
   l. An actual event capture routine;
   m. A point system;
   n. A comparison routine to compare player choices to actual events;
   o. A scoring routine to apply point values to the player's choices;
   p. A competitive routine to rank player's scores to another player's score;
   q. A cumulative routine to rank a player's performance over time;
   r. A reporting routine to display player's points, statistics, rank and performance;
   s. At least one identifiable play during a live broadcast event; and,
   t. At least one player device, and a player device application capable of communications with the system and exchange of data with the server;
   u. At least one closing moment.

2. The method in claim 1 which the player demonstrates performance improvement, reflected by the player's scores and changes to the rank each player is attributed by the competitive and cumulative routines, of their effectiveness in applying their respective knowledge and skills of the activity which is the subject matter of the live broadcast event further demonstrating each player's understanding the position, position location, score, status of where the actual participants are assigned to within the context of the activity which the actual participant is engaged in performing the actions or plays during the live broadcast event and how the actual participant will perform those actions or plays, in the role assigned to them, under the actual circumstances unfolding during the live broadcast event, and where the players use their own skills and experience to make choices based on their own strategies to mimic an actual participant engaged in the activity as observed during the live broadcast event and in which the player accumulates tie point values accumulating towards the players score in accordance with the scoring routine within the system.

3. The method in claim 1 which further comprises the playable window in which the player is able to observe the real time events contained within the live broadcast event as they develop during a live broadcast event, supplemented selective historical performance data of the participants engaged in the event where such selective historical performance data is determined by the routines of the system which assists the player in assessing real time events, making and recording the player's choice on what to do and how to conduct a play, mimicking an actual participant, at a specific position or as a team defined by a group of actual participants engaged in assigned positions, before the play occurs.

4. The method in claim 1 to record a player's choice on what to do and how to conduct the play at a specific point in time during the live broadcast event, in a very short time controlled by the player's choice input controller, including reserve time during the playable window for system routines to compute and present data to the player based on the player's performance where under-performing players are presented more information to assist that player in mimicking the participant more accurately before the play occurs; wherein the playable window controller controls when the playable window repeats during the progression of the live broadcast event and where each playable window is scored for the player by attributing point values to the player, with such point values accumulating on behalf of the player throughout the live broadcast event.

5. A method with steps to record player choices before a real time event occurs during live broadcast event in a playable window, then which comprises an opening moment not to occur until art official start signal for a particular activity of a live broadcast event is detected, and which the playable window continues to remain open until a subsequent closing moment is detected, which then the playable window which is controlled by the playable window controller, wherein practical constraints of the timing reserved for user actions are regulated by both the sequence of real time events observable to the player and that event timing incorporated within the data feed as populated into the database of the system wherein the regulation of time allowable for users actions is determined by a computed result as a function of allowance for system generated prompts for the player based on processing of historical information within the database supplemented by current events extracted from the data feed during the live event further constrained b the time required of the system to perform calculations, wherein the time allowed for computations, presentation to and consideration by the player and player selection cumulatively does not to exceed the overall time allowed during the playable window, which is followed by a closing moment.

6. The method in claim 5 further comprising a scoring and comparison routine for recording the player choice for each activity observable during the live broadcast event, prior to each real time event occurring, within the playable window; wherein, by computations within the system, the comparison routine determines the actual time stamp of the player's choice as observed in reference to the actual event time of the real time event to distinguish if the player's choice was timely and the same as in comparison to the real time event; which the comparison routine is a function within the system processes.

7. A method comprising steps to enable the player to think and react as if the player is mimicking an actual participant, by first being assigned to a position in the event as observed during a live broadcast event; wherein player's thoughts are saturated by data generated within a system generated through computations of historical information populated in a system database which is further synthesized with data related to current events happening during the live event to produce modified data based on statistically applied routines constructed within the system producing data being then presented to the player as the player contemplates the player's selection in an effort of overcome a player's particular bias and to assist the player next in making the player's choice as to what the actual event should be, in real time during the live broadcast event and capturing the player's choice as an input to the system database of the system which can then be retrieve for post processing by a comparison and at least one scoring routine to then award point value to the player after the real time events or play observed during the live broadcast event is complete.

8. A method of steps to associate a player with a position associated with the real time events observable during a live broadcast event to then which an actual athlete is assigned during the live broadcast event and then attributing scoring point values reflecting a player's choices made by the player during a playable window for each action or play; and, then using the point values accumulated to rank player scores and cumulative performance and rank; wherein the cumulative performance is then determinate within the system computations regarding how much of the playable window is next reserved for statical computation of historical information available within the system database in order to then enable the player to more accurately mimic the actual athlete; and, where player's scores are then enhanced when the player's cumulative score justifies allowing a longer playable window for the player with higher performance scores, since less statistical data is required to assist the player in mimicking the participant.

9. The method in claim 8 to attribute point values to the player which are enhanced during the comparison and scoring routines in magnitude correlating to the significance of the choice, defined as a game changing decision, made by the player when the player anticipates and chooses an outcome in which the player's choice is a lower statistical likelihood based on the data being presented to the player during the playable window yet results in a player's choice matching the actual result occurring during the live broadcast event despite what historical correlations might otherwise suggest is the likely outcome.

\* \* \* \* \*